Patented Nov. 15, 1938

2,136,567

UNITED STATES PATENT OFFICE 2,136,567

RUBBER TIRE

Cornelius W. Smith, Detroit, Mich., assignor to United States Rubber Products, Inc., New York, N. Y., a corporation of Delaware No Drawing. Application September 27, 1935, Serial No. 42,459

4 Claims. (Cl. 152—330)

My invention relates to rubber tires and more particularly to pneumatic tires having a temporary coating material for protecting the same while in transit.

In the manufacture and distribution of pneumatic tires it is generally the custom to apply a paper wrapping to each tire as a means of protection while in storage and in transit. Ordinarily, such wrappings consist of a spirally wound paper ribbon.

Where large quantities of tires are shipped to automobile manufacturers for assembly as original equipment on automobiles, the paper wrapping is omitted, however, even in quantity shipments of this kind it has been found necessary to wrap certain of the tires. For example, tires having a high grade finish, a colored sidewall decoration, or sidewalls of white rubber composition, require great care in handling, shipping, and assembling on rims in order to prevent them from becoming marred or from having the original finish otherwise blemished.

The paper wrapping of tires having white sidewalls incurs a considerable amount of labor and expense. In some cases the tires are in transit for only a short period and the tire wrappings are removed shortly after the tires are originally wrapped. Nevertheless, the wrapping has heretofore been necessary when the tires are shipped in quantities because the black surfaces of new tires are coated with a paint which readily marks the white sidewall or other colored portions when in contact therewith, and it is extremely difficult and uneconomical to ship tires in such manner that one tire will not come in contact with another.

A further objectionable feature of the conventional paper wrapping is that the wrapping must be removed before the tire is assembled on the rim. Assembling a tire on a rim is frequently an arduous task, requiring a considerable amount of manual manipulation. During such assembly operation the white sidewalls of the tire are exposed to a considerable amount of marking and objectionable finger marking or soiling, for, in view of the fresh black paint present on the tire, it is difficult for the operator to maintain clean hands during the assembling operation. It is, therefore, an object of my invention to provide a protective coating which will not interfere with the operation of assembling a tire on the rim.

Another object is the attainment of efficiency and economy in the protection of finished or colored rubber surfaces and more specifically white sidewall tires.

These and other objects and advantages will appear more fully in the continuing detailed description.

In the manufacture of white sidewall tires one of the last operations is the cleaning and finishing of the white sidewalls. At this stage of the operation, and in accordance with the practice of my invention, I apply a coating of water soluble, white paint to the exposed white sidewall surfaces. The paint may be applied either by a brushing or spraying operation. I find that good results are obtained by either method; however, it is found more efficient to spray the paint on the sidewall portions. This is easily accomplished by placing the tire horizontally on a rotary table, and turning the table slowly while holding a spray gun in the path of the white sidewall area.

I find that it is not necessary to provide a guard or shield to protect the black portion of the tire, as the spraying operation is sufficiently confined to result in a definite line between the white sidewall and the black portions of the tire. Furthermore, there is usually a circumferential rib at the line of demarcation which facilitates the confinement of the paint to the desired area. There is no objection, however, to the white paint contacting with the black portions of the tire as the paint is easily removed as hereinafter described.

The spray gun is held away from the tire a sufficient distance so that the spray is wide enough to cover the sidewall area in about two revolutions of the tire. When the sidewall is thus painted, the tire is permitted to remain in such position until it is sufficiently dry for handling. This usually requires a period of from fifteen to thirty minutes, depending on the degree of humidity of the atmosphere to which the tire is exposed. If desired, the drying operation may be facilitated by subjecting the tire to a blast of hot air, or by passing it through an oven which subjects the tire to an elevated temperature.

When the paint on the sidewall of the tire is dry, the tire is turned over, and its opposite sidewall is treated in a similar manner.

An efficient paint for this purpose may be compounded in accordance with the following recipe:

| | | |
|---|---|---|
| Whiting | pounds | 400 |
| Glue | do | 40 |
| Glycerine | do | 15 |
| Water | gallons | 30 |

The glycerine is added to prevent the glue from forming a hard or brittle coating. Additional quantities of glycerine will result in a compound producing a more flexible coating. However, it will also increase the length of time required for drying. Good results have been obtained by maintaining the proportions of the compound as stated.

When the coating applied to the tire becomes dry, it provides a hard surface capable of bending with the normal flexure of the tire due to handling, without cracking. The coating of the type given in the preceding recipe is neutral, that is, it does not discolor the rubber surface to which it is applied.

When it is desired to remove the coating, it is only necessary to soak the surface thereof with water and remove same with a brush or sponge. This may be accomplished before the tire is mounted on a rim, but preferably the coating is not removed until after the tire is mounted. As a general rule, new automobiles are washed shortly before actual delivery to the customer. The coating, therefore, may remain on the sidewall until such time, thus affording protection to the tire and requiring very little or no extra operation in the removal of the coating from the tire.

In the practice of my invention it is preferable to coat the white sidewalls of tires with white paint to make the general appearance of the coated tire resemble as closely as possible the actual, finished tire. In this way the tire is readily identified, and the coating in no way detracts from the ultimate color combination of the tire after it is assembled on the rim of an automotive vehicle. In keeping with this object, other tires having different colored sidewalls may be coated with a paint having substantially the same appearance as the actual color of the tire sidewall.

From the foregoing description it is obvious that my invention presents many advantages. Less care is required in mounting such tires, and as a result the tire may be mounted more expeditiously. The coating not only protects the tire while the tire per se is in transit, but it also protects the sidewalls of the tire after it is mounted on the rim of a motor vehicle up to the time it is ready for delivery to a customer. Such protection cannot be obtained by the conventional method of wrapping tires in paper.

While I have described a certain preferred embodiment of my invention, it will be understood that the invention may be otherwise embodied and practiced within the spirit of the invention and the scope of the appended claims.

Having thus described my invention what I claim and desire to protect by Letters Patent is:—

1. A rubber tire having a protective coating for an exposed surface comprising a relatively flexible neutral water soluble paint in a dried condition.

2. A pneumatic tire having a protective coating for an exposed surface comprising a relatively flexible neutral water soluble paint in a dried condition.

3. A pneumatic tire having at least a portion of a sidewall protected by a relatively flexible neutral coating of a water soluble paint in a dried condition.

4. A pneumatic tire having at least a portion of a colored sidewall protected by a relatively flexible neutral coating of a water soluble paint of the color of the side wall in a dried condition.

CORNELIUS W. SMITH.